United States Patent
Xenos et al.

(10) Patent No.: US 11,003,175 B2
(45) Date of Patent: May 11, 2021

(54) AUTOMATED SUPERVISORY CONTROL SYSTEM

(71) Applicant: FLEXCITON LIMITED, London (GB)

(72) Inventors: Dionysios Xenos, London (GB); Jamie Potter, London (GB)

(73) Assignee: FLEXCITON LTD, London (GB)

( * ) Notice: Subject to any disclaimer, the term of this patent is extended or adjusted under 35 U.S.C. 154(b) by 127 days.

(21) Appl. No.: 16/333,541

(22) PCT Filed: Sep. 14, 2017

(86) PCT No.: PCT/GB2017/052728
§ 371 (c)(1),
(2) Date: Mar. 14, 2019

(87) PCT Pub. No.: WO2018/051108
PCT Pub. Date: Mar. 22, 2018

(65) Prior Publication Data
US 2019/0258235 A1    Aug. 22, 2019

(30) Foreign Application Priority Data
Sep. 14, 2016  (GB) ..................... 1615651

(51) Int. Cl.
*G05B 19/41* (2006.01)
*G06F 17/18* (2006.01)
(Continued)

(52) U.S. Cl.
CPC ..... *G05B 19/41885* (2013.01); *G05B 13/048* (2013.01); *G05B 17/02* (2013.01);
(Continued)

(58) Field of Classification Search
CPC .... G05B 19/41865; G05B 2219/32015; G05B 23/0243; G05B 2219/31288;
(Continued)

(56) References Cited

U.S. PATENT DOCUMENTS

2011/0276514 A1    11/2011  Kalagnanam et al.
2011/0282475 A1*   11/2011  Ghosh ............. G05B 19/41865
                                                           700/100
2016/0314409 A1*   10/2016  Bittencourt ............ G06N 7/005

FOREIGN PATENT DOCUMENTS

| EP | 2775108 A2 | 9/2014 |
| WO | 2016108883 A1 | 7/2016 |
| WO | 2018051108 A1 | 3/2018 |

OTHER PUBLICATIONS

International Search Report and Written Opinion received for PCT Application No. PCT/GB2017/052728. dated Nov. 23, 2017. 9 pages.

(Continued)

*Primary Examiner* — Michael J Brown
(74) *Attorney, Agent, or Firm* — Finch & Maloney PLLC

(57) ABSTRACT

The present invention relates to a control system for use with industrial systems. More particularly, the present invention relates to an automated supervisory control system for providing decisions in relation to operation of one or more industrial plants or factories.

Aspects and/or embodiments seek to provide an automated supervisory control system for providing and/or automating decisions in relation to operation of one or more industrial plants and factories.

20 Claims, 8 Drawing Sheets

(51) Int. Cl.
*G06N 7/00* (2006.01)
*G05B 17/02* (2006.01)
*G05B 13/04* (2006.01)
*G05B 19/418* (2006.01)
*G05B 23/02* (2006.01)

(52) U.S. Cl.
CPC ... *G05B 19/4183* (2013.01); *G05B 19/41875* (2013.01); *G06F 17/18* (2013.01); *G06N 7/00* (2013.01)

(58) Field of Classification Search
CPC ...... G05B 2219/32371; G05B 23/0294; G05B 23/0283; G05B 19/41885; G05B 2219/42155; G05B 19/418; G05B 13/047; G05B 2219/39167; G05B 2219/32191; G05B 13/048; G05B 17/02; G05B 19/4183; G05B 19/41875; G06F 17/18; G06N 7/00; Y02P 90/80
USPC .............................................. 700/28, 29, 95
See application file for complete search history.

(56) References Cited

OTHER PUBLICATIONS

Van Horenbeek, A., and Pintelon, L., "A dynamic predictive maintenance policy for complex multi-component systems," Elsevier, Reliability Engineering and System Safety 120 (2013). pp. 39-50.

* cited by examiner

Figure 7a
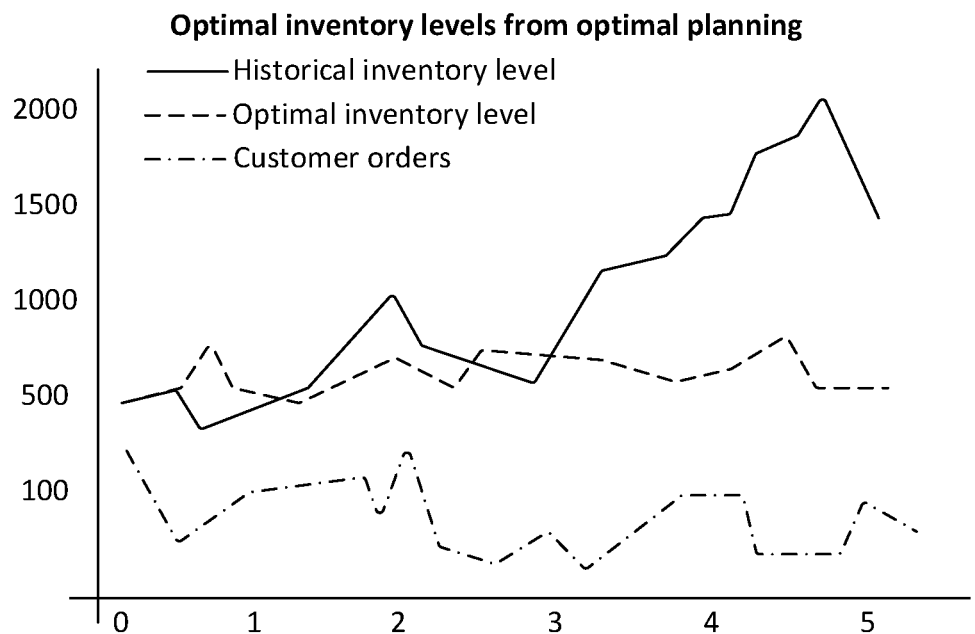
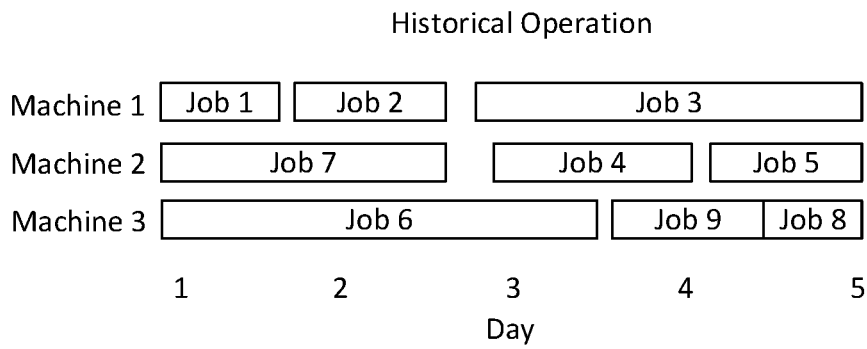
Figure 7b
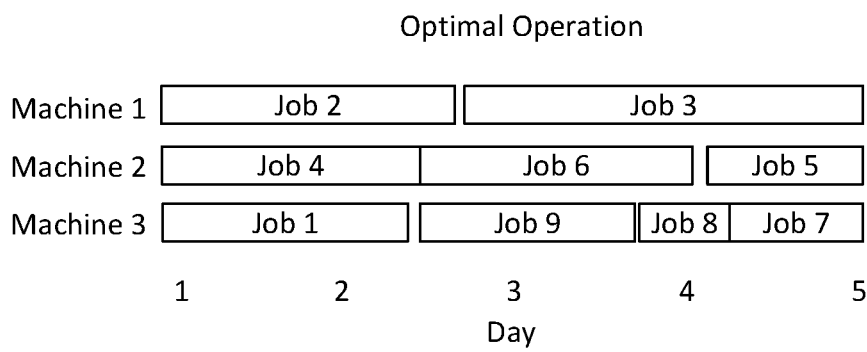
Figure 7c

AUTOMATED SUPERVISORY CONTROL SYSTEM

FIELD

The present invention relates to a control system for use with industrial systems. More particularly, the present invention relates to an automated supervisory control system for providing decisions in relation to operation of one or more industrial plants or factories.

BACKGROUND

Many conventional oil and gas operations, as well as chemical processes, use one or more pieces of rotating equipment or machines such as compressors, and water and oil pumps. Other conventional industrial plants or factories may include many different types of industrial machine or manufacturing units such as: compressors in air compressor stations, weaving machines in textile factories, furnaces in steel or other metalwork plants, and photolithography tools in semiconductor manufacturing. Examples of industrial plants and factories are: air compressor systems, power generation systems (like thermal power plants which may include gas and steam turbines), steel plants, air and natural gas compressor stations in transmission and distribution gas systems, textile factories, semiconductor manufacturing plants, food and drink manufacturers, and automotive plants.

These pieces of equipment and machines can consume significant amounts of energy to move fluids, the fluids including water and oil. The pieces of equipment and machines may also be operable to increase the pressure of gases, which may typically include natural gas and air.

Such pieces of equipment and machines are conventionally powered either by electrical motors, gas or steam turbines.

Any reduction in performance or efficiency of the pieces of equipment and machines can be extremely costly for any owners of the pieces of equipment and machines, both in terms of maintenance costs and lost revenue owing to inefficient operation. Additionally, manufacturing plants conventionally have other objectives apart from reducing operational costs such as: maximise production, reduce work in progress, reduce inventory level and improve customer service. Customer service may include ensuring the delivery of products when they are promised to be delivered. Manufacturers are usually required to keep high service levels and/or meet certain performance criterion which are typically defined by metrics such as the percentage of products delivered on time. However, manufacturers may stock a lot of product as a result, to ensure that they achieve these high service levels. Excessive stored product can be a wasted resource, however. An optimal scenario may be to have high service levels with only a minimal stock level.

Maintenance can also lead to total shutdown of a particular piece of equipment or machine, and production may cease as a consequence. Although some maintenance is planned or scheduled in advance, for example based on maximum operational hours or best practices based on previous experience, maintenance is typically performed without considering the impact of the maintenance on the operation of specific pieces of equipment and machines, or the aggregate of the pieces of equipment and machines, in the long term.

Further, employing a maintenance strategy influenced by one or more operational conditions, for example using a corrective maintenance approach whereby the maintenance happens only after the machine fails, means that a machine may fail unexpectedly during production and so the production will need to stop until the machine is repaired. Alternatively, another machine, which may have different efficiency characteristics, can replace the failed machine while the failed machine is being repaired—but this can then impact upon the overall or aggregate efficiency or throughput of the operation.

Some or all of the above factors can result in significant reduction in efficiency, owing to the variable efficiency of each pieces of equipment or machine and hence misallocated workflows or tasking, along with maintenance requirements which do not take such workflows or taskings into account.

The conventional maintenance approaches for industrial machines in industrial plants and factories have historically been corrective and time based maintenance. The former means that a machine is maintained after failure is realised, the latter means that the machine is maintained in predefined periods.

Predictive analytic methods have been developed which can estimate the expected time taken or the probability distribution of the time taken until the failure of a machine. This type of analysis provides information to the end-user of the machines which would help them to take better maintenance decisions of their assets. However, the end-user is left to take ad-hoc decisions such as of what type of maintenance to carry out and when. The aforementioned approaches are limited and are still expected to lead to inefficient operation and maintenance. The planning and scheduling of the operational and maintenance actions requires several decisions to be taken under various and uncertain parameters for example volatile demands, changing market prices and changing electricity prices which makes it hard or impossible to take the best decisions which could minimise total costs or maximise production.

SUMMARY OF INVENTION

Aspects and/or embodiments seek to provide an automated supervisory control system for providing and/or automating decisions in relation to operation of one or more industrial plants and factories.

According to a first aspect, there is provided an optimisation system for the control of one or more industrial plants and/or factories, comprising: a first, short term data-driven, optimisation module; and a second, long term data-driven, optimisation module; wherein the first optimisation module is operable to build and/or update one or more statistical models from sensory data relating to the one or more industrial machines; and further wherein the second optimisation module is operable to model and/or predict the performance of one or more industrial machines based on historical data relating to the one or more industrial machines; and wherein the first and second optimisation modules generate one or more decisions regarding the operation of the one or more industrial machines.

Such an optimisation system can allow for more efficient use of one or more machines within one or more plants, which may comprise one or more factories. Downtime, or time when one or more machines are not being used at their full capacity, can be reduced through such analysis. The first and second optimisation modules can receive data from sensors or that has been stored or manually provided/entered in relation to the industrial machines. The data may comprise real time sensory or transactional data. The data may further comprise one or more of: sensor data related to machines; transactional data related to machines; supply and demand data related to the plant; maintenance events related to machines; failure of machines related to machines. For example, the first optimisation module can receive sensory data or data from sensors built into or provided nearby relating to the one or more industrial machines. The first and/or second optimisation modules can be configured to together, or separately, generate decisions regarding the operation of the one or more industrial machines. The historical data can include sensory data collected over a long time period.

Optionally, the one or more decisions are provided as one or more inputs to one or more control systems relating to the one or more industrial machines.

Providing the one or more decisions as one or more inputs to the control systems for the one or more industrial machines can allow for control of the machines based on computation of the input sensory and historical data. Therefore, decisions which are leading to further inefficiency, or are otherwise not preferable, can be taken into account by the first and/or second optimisation modules for control of the one or more industrial machines.

Optionally, the sensory data is collected from one or more sensors operable to receive data regarding the one or more industrial machines. Optionally, the sensory data is in relation to one or more of: a pressure; a temperature; vibration; volumetric flow, humidity; and/or a power output.

Such data is commonly collected from industrial machinery, and provides a useful insight into the functioning of same. Further, such data can be collated easily and has the potential to comprise trends which could indicate relevant pieces of information about a machine, for example an increase in vibration indicates an increased risk of failure of a machine in the future. Sensor data may be used in conjunction with historic failure events and maintenance history, which could potentially comprise one or more helpful trends. Data used may further comprise one or more of: historic transactional data to calculate production rates, for example produced metres of fabric, or processing times in hours in a textile plant; historic data of supply, inventories, and demand to forecast demands and raw material orders, for example historic targets or actual minimum stock levels of different products in factories; and/or historic failures of machines information to predict future failures of the machines, for example electric motor breakdowns. The historic transactional, supply and demand data may be acquired from an Enterprise Resource Planning (ERP) database and the historic maintenance information may be acquired from a Maintenance Management System (MMS) database.

Optionally, the first optimisation module is operable to reduce operational costs which may include one or more of: energy costs such as electricity or natural gas costs; costs or penalties relating to non-satisfaction of demand or non-delivered production; and/or water costs.

The second optimisation module may be operable to minimise or maximise an objective function while at the same time operational or other constraints are respected. This optimisation may refer to mixed integer linear or non-linear programming formulation including continuous and integer variables. For example, the objective function could represent the total operational and maintenance costs of a factory such as shut down, start up costs, inventory costs, labour costs, maintenance costs, and changeover costs. Changeover in this context may refer to the process of preparing a machine to process a new product. This process conventionally requires time which may result in loss of production with an associated cost.

Optionally, the second optimisation module is further operable to predict the performance of one or more industrial machines based on forecasted information. Optionally, the forecasted information comprises utility prices and/or demands. Optionally, the second optimisation module is further operable to predict the performance of one or more industrial machines based on one or more of: historic sensor and transactional data; maintenance requirements; and/or maintenance history. Optionally, the second optimisation module is operable to minimise total costs of running the one or more industrial machines which may include one or more of: energy costs; cleaning and maintenance costs; labour costs; production loss costs; inventory costs; operating costs such as start-up costs; emissions costs; and/or costs of the purchase of external products for example when a local plant cannot meet its own required demand. Optionally, the second optimisation module is operable to perform one or more of: reducing work in progress; maximising profit; maximising production; and/or reducing cycle times.

Conventionally, managers and/or operators of machinery are keen to reduce their operational costs. If inefficiency is present, such costs may be needlessly wasteful and reduce the profit made from the performance of the machines. It can therefore be advantageous if any optimisation modules are arranged to minimise costs. Forecasted information may further comprise supply related data, for example the arrival of future shipments of supplies (such as raw material orders). Optimisation generally may further comprise the reduction of inventory and/or scrap materials.

Optionally, the first and/or second optimisation modules include a measure of uncertainty or an uncertainty value and optionally in relation to any forecasted parameters comprising one or more of: processing times of jobs; future temperatures; fault predictions; and/or future demands.

It is understood that when short and/or long term models are being generated, some relevant information may be absent. If the first and/or second optimisation modules are equipped to deal with the absence of some information which may be helpful or relevant, then more accurate optimisation decisions can be produced in due course. Considering uncertainty may also involve assuming that unexpected events or scenarios are likely to arise in a following predetermined time period, or that there is a threshold probability that such events or scenarios will arise within a given time period, and therefore providing decisions for the future considering the possibility or probability of such events happening.

Optionally, the optimisation system is operable to output one or more predictions of maintenance requirements, optionally wherein the one or more predictions of maintenance requirements comprises: analysing the probability distribution of time taken until failure of one or more pieces of equipment and/or determining a schedule for maintenance using any of: uncertainty parameters; utility prices and/or demand(s).

Predictions of maintenance requirements may comprise analysing the probability distribution of time taken until failures of the machines, and calculating the optimal schedule for maintenance while considering one of more uncertain parameters such as: utility prices or demands. This may comprise part of a medium-term or long-term optimisation module or layer. Such an arrangement may comprise and/or require a single optimisation layer.

Optionally, there is further provided a third, medium term data-driven, optimisation module. Optionally, one of the optimisation layers considers uncertainty in one or more performance models. Optionally, the first optimisation layer considers uncertainty in one or more performance models. Optionally, one of the optimisation layers considers uncertainty in one or more of: future cost functions, which may comprise costs of products and/or utility costs; and/or future demands. Optionally, the second optimisation layer considers uncertainty in one or more of: future cost functions, which may comprise costs of products and/or utility costs; and/or future demands. Optionally, one of the optimisation layers considers uncertainty in one or more of: future demands; raw material specifications; and/or utility prices. Optionally, the third optimisation layer considers uncertainty in one or more of: future demands; raw material specifications; and/or utility prices. Optionally, the optimisation system is operable to model and/or predict the demand of one or more industrial plants and/or factories.

The use of a third optimisation module can provide significant increases in efficiency when compared with the use of only two optimisation modules. Different data may be considered. For example, rather than looking exclusively at short-term and long-term benefits, a medium term may be considered. Such efficiencies may be considered at a very granular level, for example a singular piece of apparatus, all the way to a very high level overview, for example one or more entire factories. The long term data-driven optimisation module may further be operable to make planning-related decisions, for example deciding optimum monthly stock levels and monthly total production of a plant. These may be referred to as "high level" decisions.

According to a further aspect, there is provided a method of optimising for the control of one or more industrial plants and/or factories, the method comprising the steps of: building and/or updating one or more statistical models from sensory data relating to the one or more industrial machines; and further predicting and/or modelling the performance of one or more industrial machines based on historical data relating to the one or more industrial machines; and generating one or more decisions regarding the operation of the one or more industrial machines based on the steps of building and/or updating one or more statistical models and/or predicting and/or modelling the performance of one or more industrial machines.

The data analysis phase may be operable to build prediction models, the models may not be used to perform predictions in the data analysis phase. In at least one embodiment, the prediction models are constructed and then provided to an optimisation layer. The optimisation layer may be arranged to use the prediction models. The prediction models may comprise at least a part of the constraints of a mathematical programming model (which may be operable to perform the optimisation).

According to a further aspect, there is provided a optimisation control apparatus for one or more industrial plants and/or factories, comprising: a first, short term data-driven, optimisation module; and a second, long term data-driven, optimisation module; wherein the first optimisation module is operable to build and/or update one or more statistical models from sensory data relating to the one or more industrial machines; and further wherein the second optimisation module is operable to model and/or predict the performance of one or more industrial machines based on historical data relating to the one or more industrial machines; wherein the first and/or second optimisation modules generate one or more decisions regarding the operation of the one or more industrial machines.

In some embodiments, more than two optimisation layers may be present. In other embodiments three or more optimisation layers may be present. One or more secondary optimisation layers may be present in between the plurality of optimisation layers disclosed herein. Any optimisation layers present may be interdependent on one another. In other embodiments or aspects any of the first, second or third optimisation modules may each be any of the short term data-driven optimisation module; the long term data-driven optimisation module or the medium term data-driven optimisation module.

According to a further aspect, there is provided a computer program product operable to provide an optimisation control system and/or method and/or apparatus for one or more industrial plants and/or factories according to any other aspect.

BRIEF DESCRIPTION OF DRAWINGS

Embodiments will now be described, by way of example only and with reference to the accompanying drawings having like-reference numerals, in which:

FIGS. 7a-c show exemplary planning and scheduling savings for a textile factory.

SPECIFIC DESCRIPTION

Figure 1:
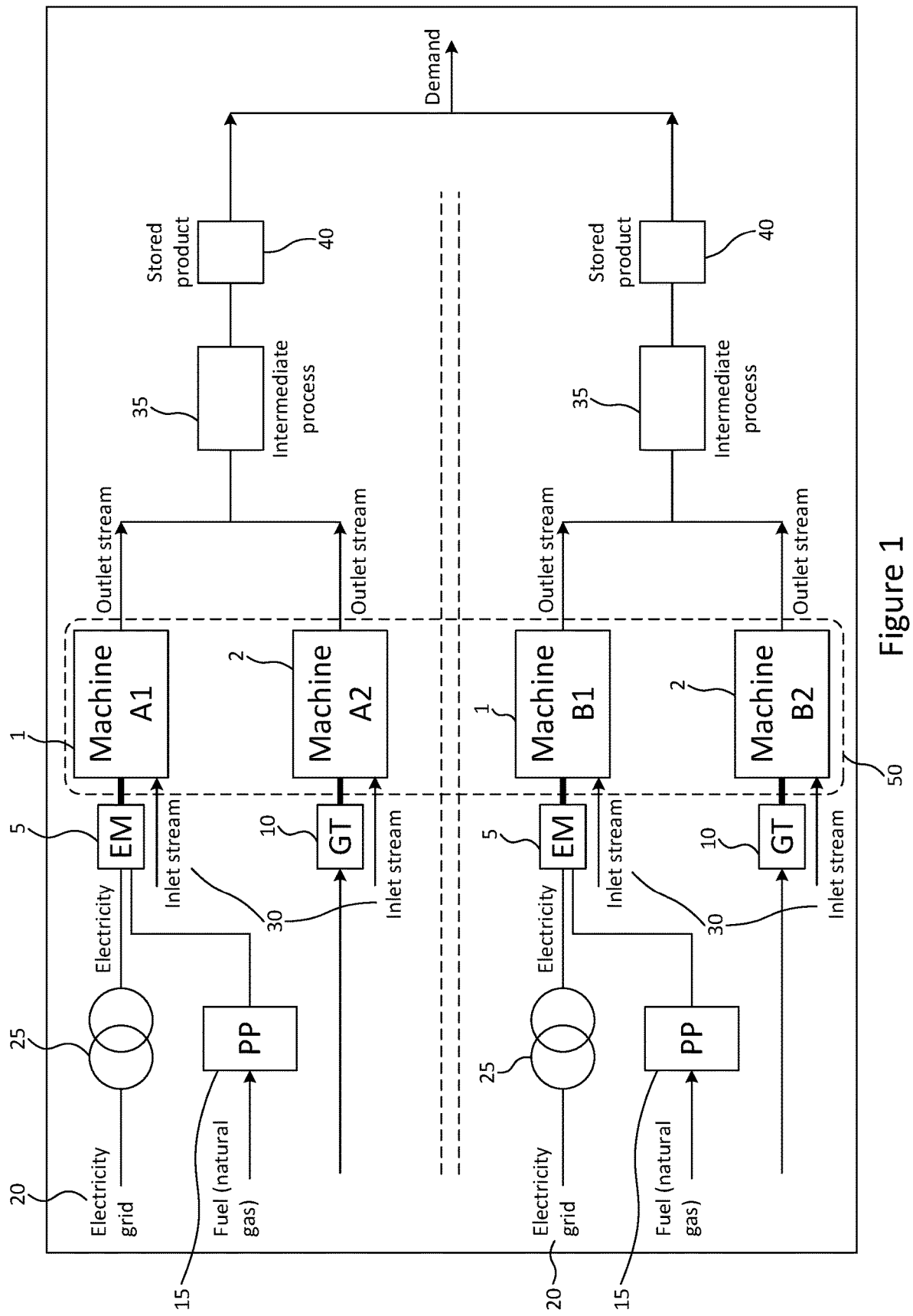
FIG. 1 shows a flowchart of multiple compression systems with multiple pieces of rotating equipment.

FIG. 1 shows a generic diagram of multiple compression systems using multiple pieces of rotating equipment 1, 2 (which may hereafter be referred to generically as machines 50). The machines 50 can be conventionally powered, for example by either electrical motors 5 or gas turbines 10. The gas turbines burn fuel 15 to power the rotating equipment, while the electrical motors are supplied with electricity from the electricity grid 20 (or from in-house power plants 15 which burn fuel to generate electricity).

In the case of a natural gas compressor station, gas compressor machines can be used to increase the pressure of an inlet stream 30 of the gas. Once compressed, the gas is transported to downstream systems to reach the final end-customers. A compressor station can have many compressors working in parallel to provide the total flow throughput required. The purpose of a compressor station is to compress gas, for a variety of uses, and compressor stations can vary in size from one compressor up to many banks of compressors working in parallel.

In the case of the chemical processes used in, for example, an air separation plant, air compressors are used to compress ambient air to high pressure for supply as a staple industrial product. This compressed air can then be used by intermediate processes 35 in the air separation plant. For example, the compressed air can be allowed to expand or decompress, whereupon its temperature cools to lower temperatures through the Joule-Thomson effect—for example for cryogenic purposes during air separation. Air separation columns can be used with such a cryogenic process to separate a cooled air stream into final products including oxygen, nitrogen and argon. These products 40 of an air separation plant can be used in downstream industrial processes, such as oxidation.

In the above examples, the machines 50 are typically multi-stage compressors with intercoolers, driven either by electrical motors 5 or gas turbines 10. Degradation of one or more of: the machines 50, the electrical motors 5, and/or the power plant 15 can cause the total efficiency of the compression system to change over time.

Degradation can be reversed through maintenance, however the optimal operation and maintenance of a compression system regularly requires a number of distinct decisions, for example: how much to load each machine; how much product to store and when to store it; when to start up a machine and when to shut it down; when to wash each machine; and when to shut-down the machine for inspection and replacing spare parts of it.

The optimal operation of such machines 50 can present a complex problem, as the energy consumption of the machines 50 depends on many uncertain time-varying parameters. Such parameters may include: unit prices of utilities, such as natural gas or electricity; demand fluctuations based on local population requirements; and ambient weather conditions. In order to prevent loss of utility and maximise revenue for the machine operator, it can be important for the machines 50 to produce a sufficient quantity of a final product or staple industrial product to meet the demand requirements, with minimal interruption in service. As the efficiency of a machine 1, 2 generally deteriorates over time from fouling accumulation, the estimation of the change in efficiency depends on many parameters such as continuous operating hours since last maintenance, operational conditions such as flow, pressure and/or temperature, and environmental conditions such as concentration of salt, dust and/or humidity.

Maintenance can improve the efficiency of such machines 50, although the machines 50 generally have to be deactivated during such work, thereby halting or significantly reducing production.

Figure 2:
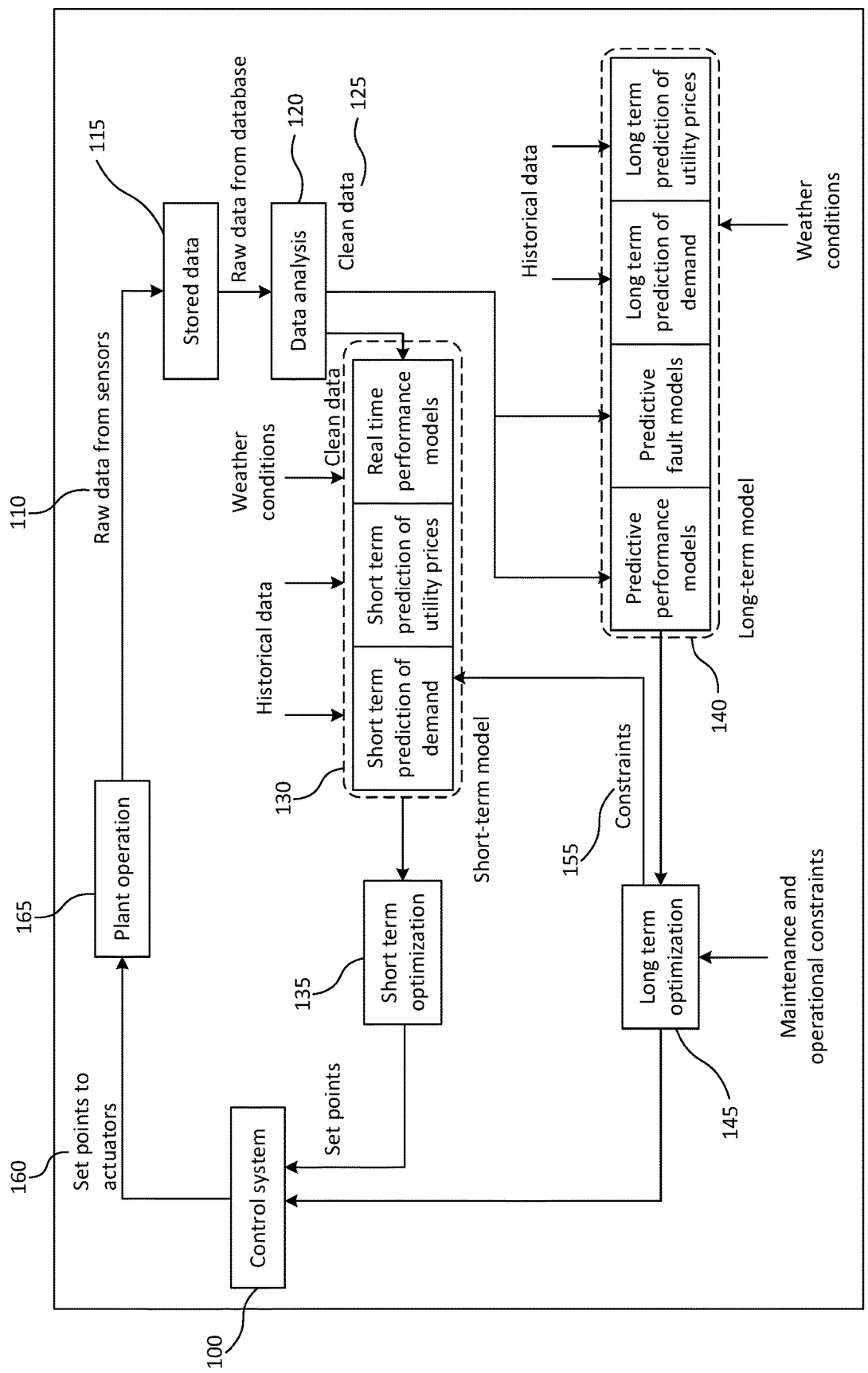
FIG. 2 shows a flowchart of an automated supervisory control system arranged to optimise operation and maintenance simultaneously.

FIG. 2 provides a solution to the potential problems raised through the use of the apparatus of FIG. 1. An automated supervisory control system 100 is provided, which optimises maintenance and operation simultaneously. The supervisory control system 100 involves an integrated optimisation framework which considers operational and maintenance constraints. Examples of operational constraints are that the machines 50 have to operate between a minimum and maximum operational limit, and that the production of plant has to satisfy the demand at all times. Example of maintenance constraints are the number of the available maintenance personnel, and the minimum and maximum durations required to carry various maintenance events.

A first embodiment of the flowchart of the novel automated supervisory control system which optimises the operation and maintenance simultaneously is shown in FIG. 2.

Historical data for supplementary data relating to, for example, weather conditions and electricity prices can be provided from external sources, for examples from third parties which have stored past weather data for public retrieval. Historical electricity prices data can be provided by providers such as the APX (power exchange market services), for example.

The framework includes a frequent real-time optimisation loop and a low-frequency long term optimisation loop. Raw process data 110, such as pressures, temperatures and powers, are collected from sensors of the rotating equipment and stored in a database 115. The sensors may be attached inside or on various parts of the machines 50, or within the environment surrounding the machines 50. Example sensors are thermistors and pressure gauges.

The raw data are filtered and reconciled in step 120 to generate clean data 125. The clean data 125 may then be used to build and/or update statistical models which describe the current performance of the rotating equipment or other machinery. Ambient conditions, demands and electricity prices can be updated to feed one or more short term optimisation models 130. The optimisation models 130 can be fed into a short-term optimisation module 135. Examples of short term decisions may include: an appropriate level to load the rotating equipment, how much product to store, and how much water to use to cool for any intercoolers. A primary objective of the short-term optimisation model is to reduce operational costs, such as energy costs including electricity costs, and utility costs such as water costs.

Clean data 125 may also be employed by one or more long term models 140 which are operable to predict the performance of the machines 50 considering forecasted information of the utility prices and demands. Recovered or restored efficiency of one or more machines following maintenance can be modelled using historical data. Historical data may further be used to predict faults and breakdowns which influence the decisions for the usage of the machines in the long term. Historical data may further be used to build forecasts of demands and utility prices. The optimisation models 140 can be fed into a long-term optimisation module 145. Any updated long term models 140 can be further used in the long-term optimisation module 145 which considers operational and maintenance constraints.

The objective of the long-term optimisation model 140 can be to minimise total costs, which may include: energy costs, cleaning costs, production loss costs, inventory costs such as the costs associated with keeping a stored product, operating costs such as start-up costs, and emissions and costs of the purchase of external products when a local plant cannot meet its own required demand.

Short term operational and maintenance decisions can be based on how the machines will be maintained and will be run in the long term. Constraints 155 liable to produce effects relevant to the one or more short term models 130 may be communicated to same, and relevant data incorporated. This automated supervisory control system 100 considers an integrated optimisation framework which uses short term 130 and long term 140 data-driven models considering uncertainty in the models and in other parameters such as utility prices. The short-term models 130 can be used to optimise the operation of the machines 50 of the plant system, and may, for example, provide operational updates and amendments every few hours. The long-term models 140 can be used to optimise operation and maintenance in the long term considering information, for example, for several days or weeks. Process data 110 from the sensors of the machines are used to build data-driven models.

The digital signals of the measurements of the sensors are sent to a distributed control system (hereafter referred to as a DCS). The DCS collects all such signals from sensors inside or on the machines 50 or within the environment surrounding the machines 50. The DCS is also operable to send signals to actuators 160 or control mechanisms of the machines to manipulate their settings or relevant variables (e.g. speed drives of the motors, opening of valves) which control process variables (e.g. pressure and mass flow—which influence the power consumption). The DCS can use algorithms to determine the output signals to send to these actuators 160 or control mechanisms. The transmission of the signals from the DCS to the machines 50 can be through wiring and in some cases wireless. The DCS also sends the output and/or input signals to one or more databases in one or more computer systems (servers), known as a "historian". The historian keeps this data and makes it available to the machine users. By accessing the data stored by the historian and using the stored data 115, the historical data can be collected for optimisation. Then parts of the short term 135 and/or long term 145 modules apart from the control system 100, plant operation 165, and stored data 115 blocks, calculate the optimal set points of the control system. The decisions which comprise the optimal set points are then sent to the DCS, whereupon instructions may be provided to the controllers of the machines.

The use of the automated supervisory control system 100 therefore allows for automatically generated decisions to be produced and distributed to actuators 160 which, if implemented, can minimise the total costs of a plant or other industrial setting which relies at least partially on the use of such machines 50. These decisions can be applied through the automated supervisory control system 100 itself to the plant. By including uncertainty in the optimisation of the rotating equipment models 130, 140, then the output of the automated supervisory control system 100 framework provides a robust proactive solution compared to current deterministic reactive or preventive approaches.

Optimisation models being made under uncertainty are considered in the art as those models operable to generate decisions without immediately knowing the full effects of those decisions. The maintenance and operational constraints are simultaneously considered in the optimisation, and short term 130 and long term 140 models for optimisation are linked. The terms "optimisation layers" and "optimisation modules" may be used interchangeably.

It will be clear to a person skilled in the art that aspects and/or embodiments may be applied to other cases such as gas lifting compressors, product compressors of air separation plants, industrial pumps for pumping oil, industrial pumps for pumping cooling water, or smaller-scale machinery.

Figure 3:
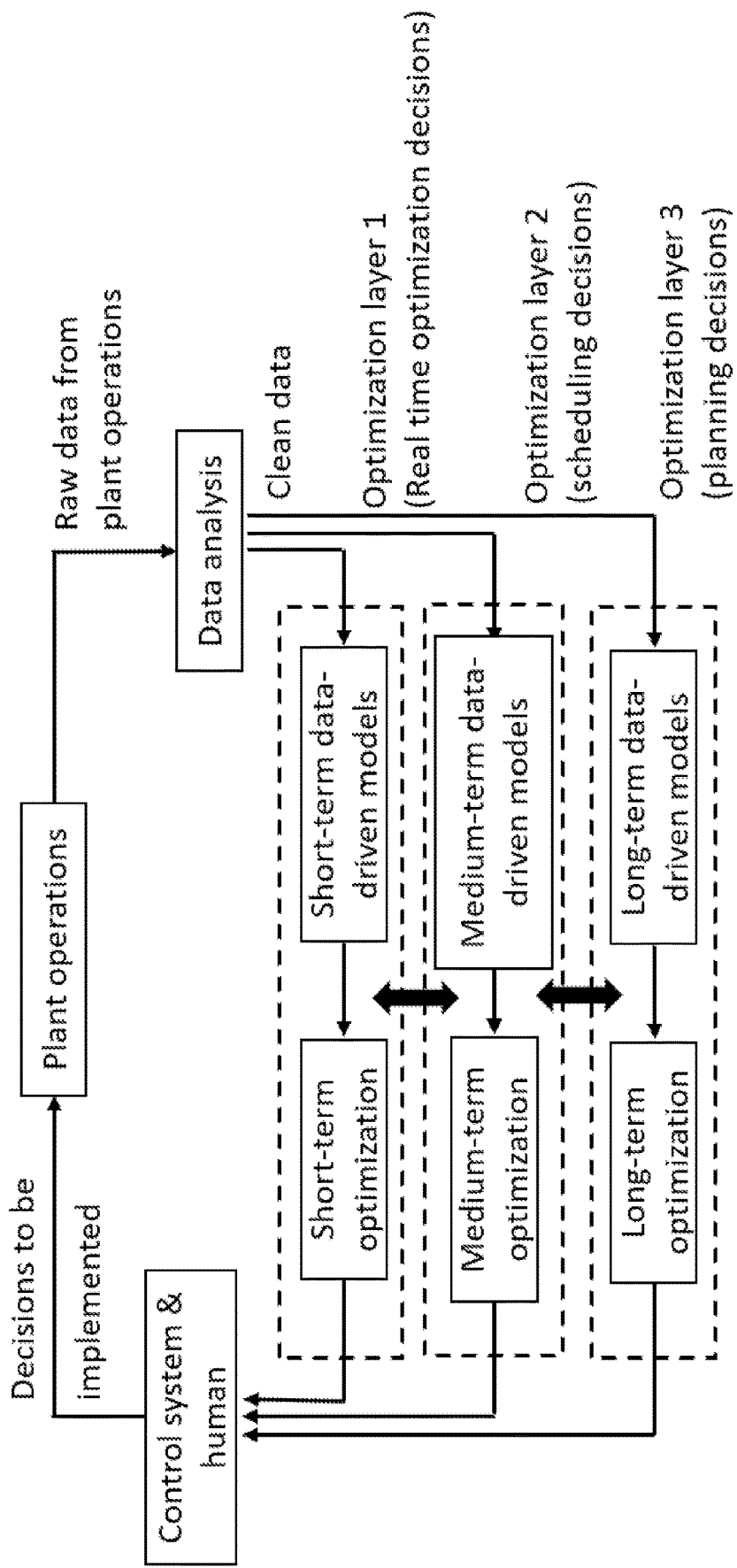
FIG. 3 shows a flowchart for optimising operations of industrial plants and factories.
Figure 4:
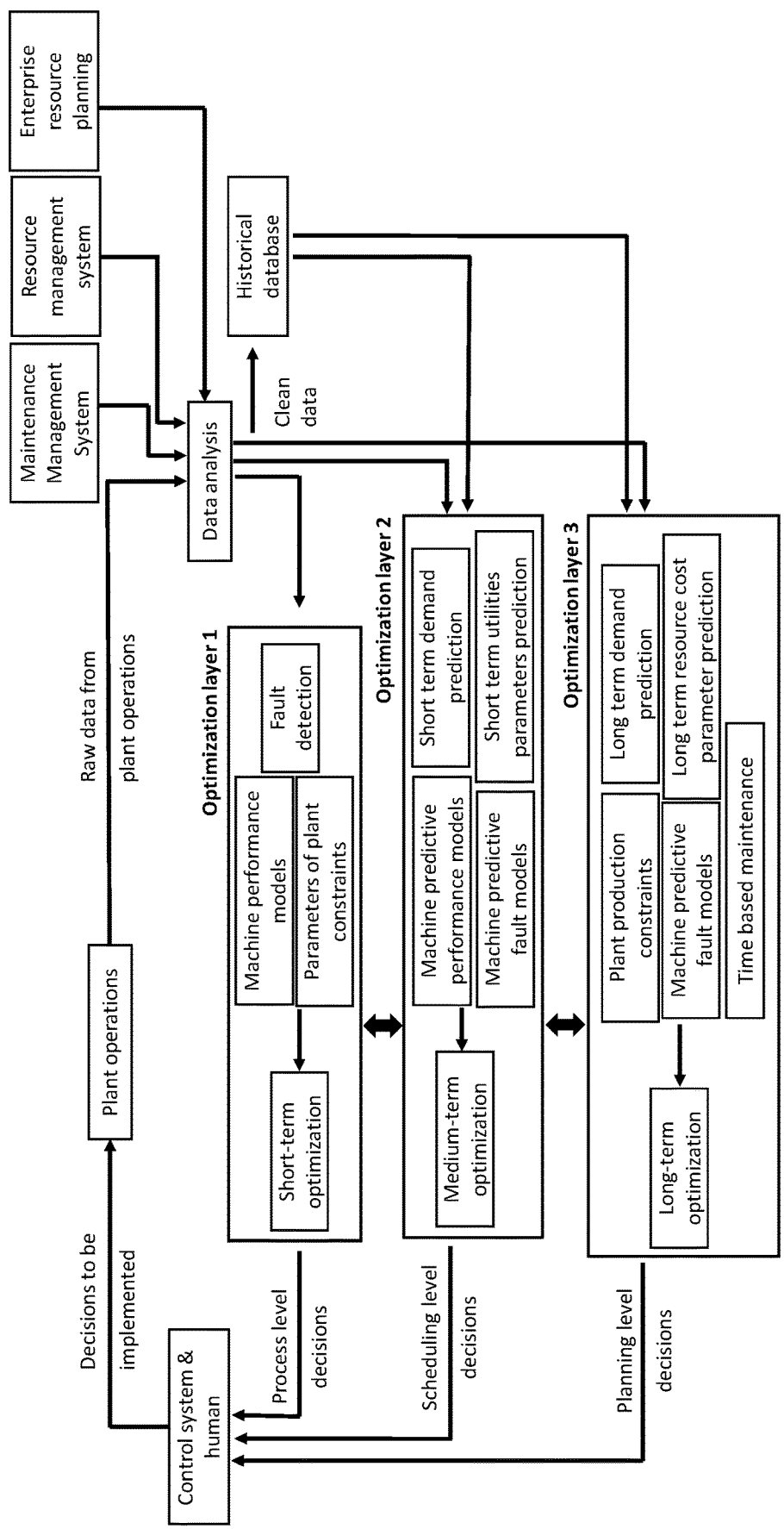
FIG. 4 shows a more detailed flowchart for optimising operations of industrial plants and factories.

A high-level overview of a further embodiment of the automated supervisory control system which optimises the operation and maintenance simultaneously is shown in FIG. 3. A more detailed view is shown in FIG. 4. A method is shown which includes three main optimisation layers.

Optimisation layer 1 may be substantially the same as the same as the short-term optimisation layer as disclosed in the previous embodiment. This optimisation may be generic and can be applied to any type of plant and/or factory. The output of the optimisation may comprise process set points of operational variables of machines which can be implemented automatically through a control system or manually through a human. Examples of these operational variables could be speed of an electrical motor and flow of a gas and positioning of a valve. Optimisation layer 2 may deal with scheduling decisions. This optimisation can consider a time horizon between days and weeks. This optimisation layer can be arranged to determine how to run industrial machines to meet various operational objectives, for example minimum operational cost and/or maximum production. Optimisation layer 2 can be operable to decide which machines to use, when to use them, and which products to be processed in which machine and in which order. Optimisation layer 3 can be arranged to determine high level decisions, for example production targets of industrial plants for the upcoming weeks or months, and stock levels of products.

These optimisation layers may be interdependent. Optimisation layer 3 can provide objectives to optimisation layer 2. Optimisation layer 2 can define the configuration of the machines in optimisation layer 1. When a feasible solution cannot be found then optimisation layer 2 may be required to reschedule the operations and determine a configuration which allows optimisation layer 1 to find a feasible and optimal solution. In a similar way regarding optimisation layer 2 specifically, the scheduling of jobs and machines may not be feasible because the optimisation layer 3 calculated production targets and inventories which do not allow for optimisation layer 2 to find a feasible schedule. Thus optimisation layer 3 may be required to re-run and estimate a new solution. One or more optimisation layers may be present between optimisation layers 1 and 2, and between optimisations layers 2 and 3. In other embodiments, there may be fewer than the three main optimisation layers. The decision for the number of layers required may depend on the scope of the application required.

Figure 5:
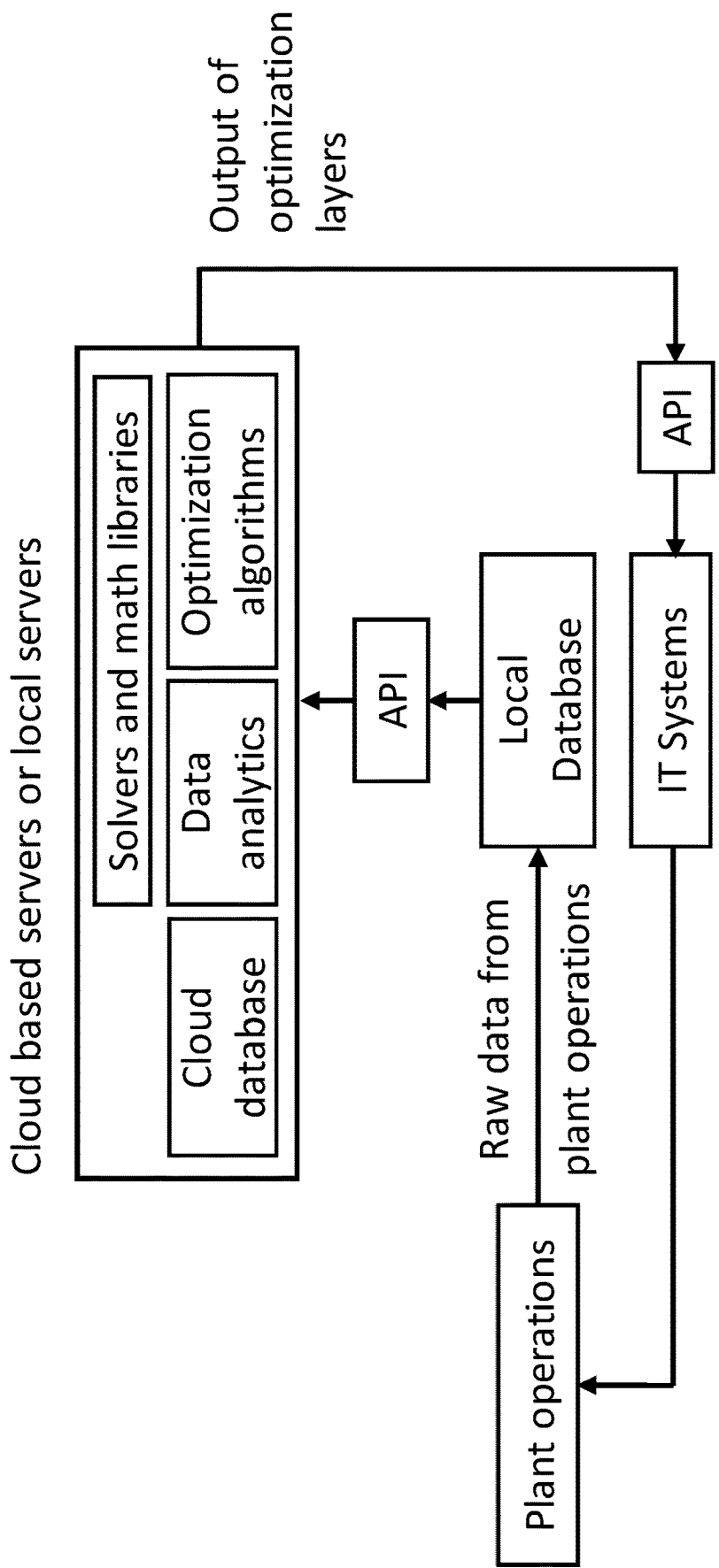
FIG. 5 shows an exemplary information technology (IT) infrastructure and information flow.

FIG. 5 shows an exemplary IT infrastructure and information flow. The automated supervisory control system can involve one or more servers and application programming interfaces (APIs) to communicate with the database and IT systems of a plant. A generic automated supervisory control system is shown. Raw data may be collected from sensors coupled to the industrial machines. Data collection may further include production data (demands), transactional data (start and end times of processing jobs) and finance data (costs of products and utility prices). The data can be stored in a local database or on a cloud based server. The data may then be called through an API and then either stored or directly manipulated in cloud based servers. The cloud based servers can include algorithms based on the general method described herein. The data may be analysed to develop one or more of: statistical models of the machines for predicting key operational parameters such as power consumption and production rates; statistical models which identify or predict faults; forecasting tools to predict demands, and utility and other cost functions; and/or models which describe the operational constraints of the plant and machines.

A multilayer optimisation framework may be used to estimate the best operational and maintenance decisions simultaneously. The optimisation framework may be operable to receive one or more inputs from predictions of maintenance requirements (which may include machine predictive fault models or machine predictive performance models). The optimisation framework may further be operable to receive one or more inputs from desirable maintenance requirements for a future period (preventive maintenance). The optimisation framework may be operable to determine the exact time which machine should be maintained and the type of maintenance. The optimisation framework may further be capable of receiving real time information for unexpected breakdowns or failures of machines, i.e. corrective maintenance. The operations of the machines may then be rescheduled by the optimisation framework, and the optimal schedule provided. The framework is hence capable of working with corrective, preventive and predictive maintenance. Predictions of maintenance requirements may comprise analysing the probability distribution of time taken until failures of the machines, and calculating the optimal schedule for maintenance while considering one of more uncertain parameters such as: utility prices or demands. This may comprise part of a medium-term or long-term optimisation module or layer. Such an arrangement may comprise and/or require a single optimisation layer.

The output of the data analysis can be used to build optimisation models which maximise or minimise an objective criterion while simultaneously considering operational constraints which can be determined from the data-driven models. The data-driven models can be derived from the data analysis and/or expert knowledge. Expert knowledge can be provided from industry experts using their know-how to refine the operational constraints based on experience and/or engineering knowledge. One or more elements of the outlined procedure may occur offline, and usually in the beginning of the development of the application.

Figure 6A:
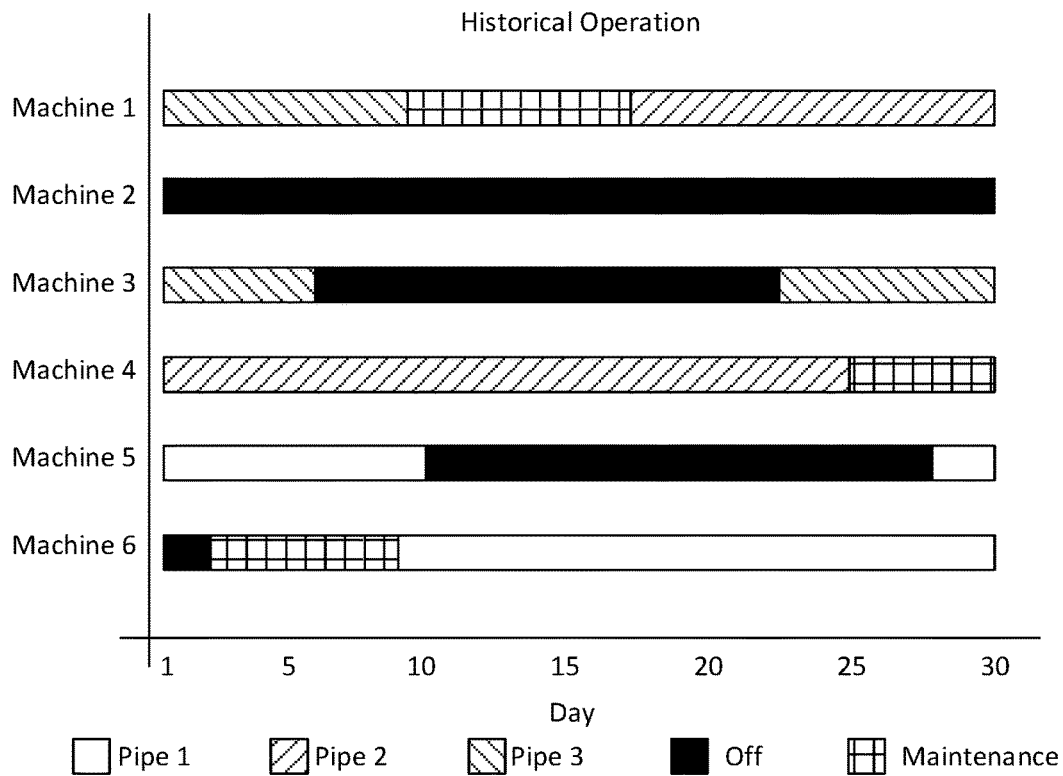
FIGS. 6a and 6b show exemplary schedules of historic and optimal operation for a large industrial compressor station.
Figure 6B:
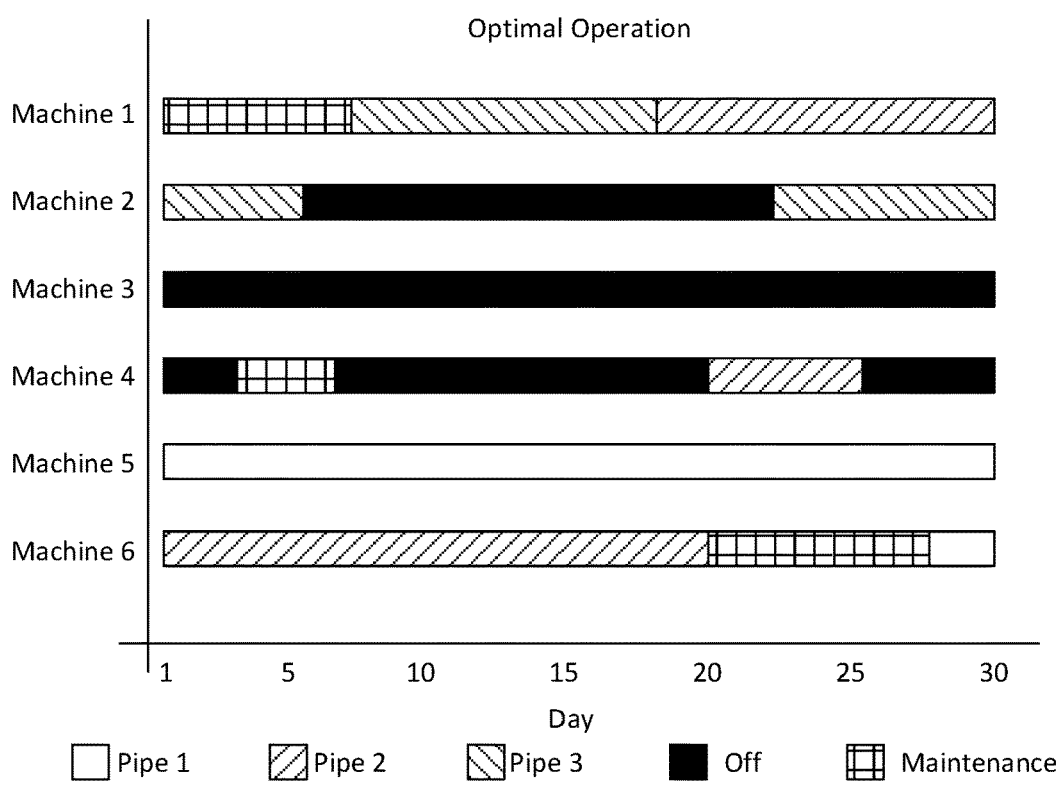

FIGS. 6a and 6b show exemplary schedules of historic and optimal operation for a large industrial compressor station, and FIGS. 7a-c show exemplary planning and scheduling savings for a textile factory. Compressor stations can be found in chemical plants (e.g. air separation) and manufacturing plants (e.g. steel plants). The optimisation of the operation and maintenance of a network of compressor stations can be a problem with multiple stages (compression in compressor station A, compression in compressor station B, etc.), and/or multi-product (wherein in this embodiment product may be the compressed gas with specific conditions) with multiple machines (different compressors are conventionally arranged to run in parallel).

Figure 8:
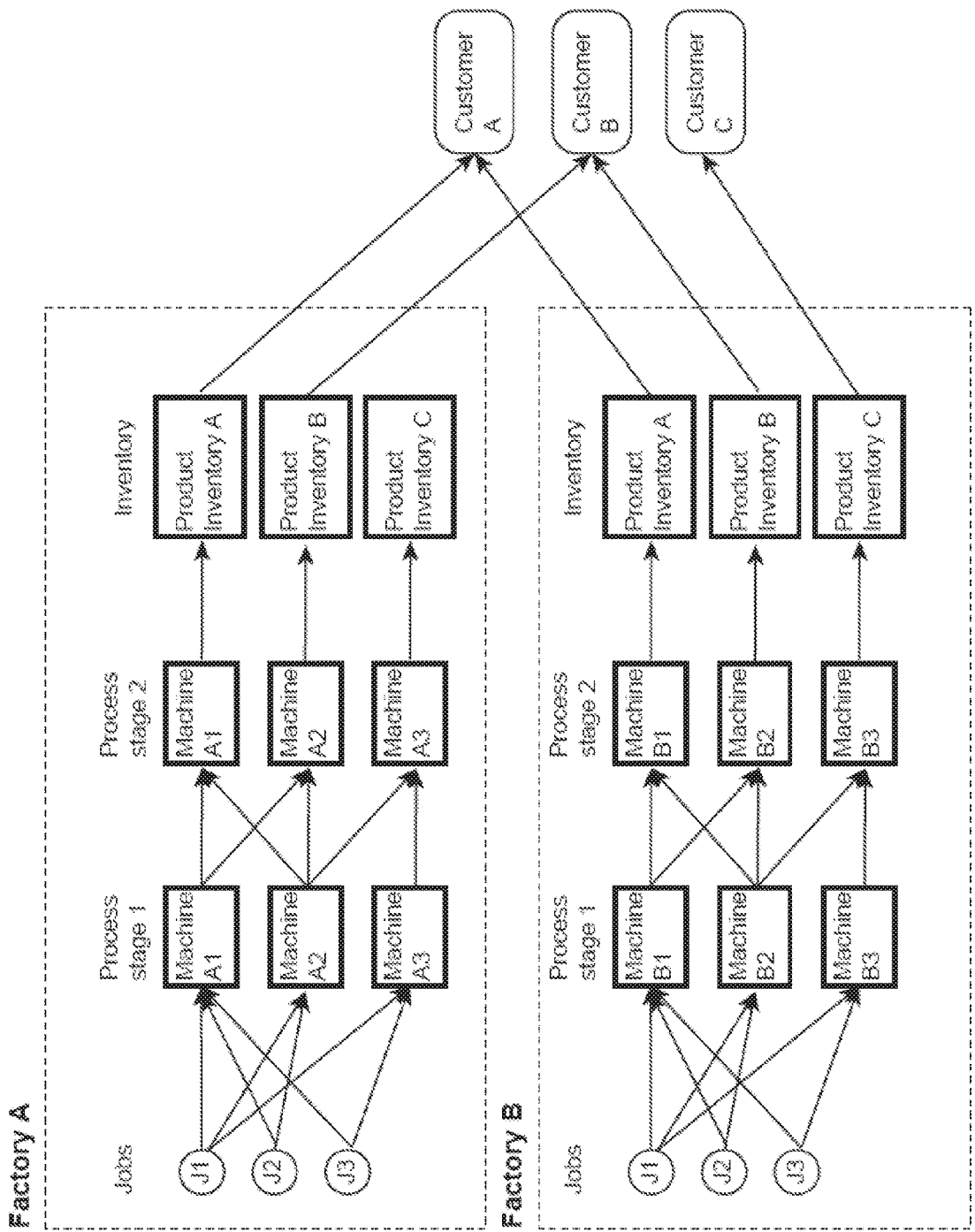
FIG. 8 shows exemplary manufacturing process systems of two factories including multiple machines and process steps.

FIG. 8 shows an exemplary manufacturing process system, comprising a typical manufacturing problem. In this example, there are two similar factories A and B which need to satisfy the demand of customers A, B and C. There is a plurality of jobs (here J1, J2 and J3) to be scheduled. "Jobs" refers to discrete quantities of products which need to be processed through one or more process stages to produce the end product.

The planning problem is that the decision makers of the factories need to decide the monthly inventory levels of products for each factory. The decision makers need to decide what are the optimal levels of the inventories which could satisfy the future demand. The dependencies between the two factories and uncertainty in the demand results in a very complicated problem.

The output of the planning problem is the inventory levels. This output is used to schedule the operations of the plant at a more frequent basis compared to the planning problem, e.g. weekly basis. Plant managers may need to take weekly decisions on how to operate and maintain the machines in order to meet the monthly targets of the inventory levels. Examples of these decisions are which jobs to be processed in each stage, which machines to use to process a job in each stage and what is the sequence of the processing of the jobs. This is conventionally a complex problem to solve considering that a factory often comprises tens to hundreds of machines, each with several process steps, and there can be thousands of products to be process.

The disclosure herein applies an optimisation multi-layer framework to determine one or more of: optimal inventory levels (planning decision); optimal assignments of jobs to machines (scheduling decision); optimal sequencing and grouping of jobs (scheduling decision); and/or other factors which may be of relevance to the efficient running of the system. Uncertainty in the processing times may be considered, alongside uncertainty in the demand of the customers and supply, uncertainty in the condition of the machine, or uncertainty in fault predictions. Historic and real time data may be used to determine the probabilities of failures of the machines. This information is used in one or more optimisation layers to maintain the machines in an optimal way (predictive maintenance) compared to conventional time-based maintenance strategies.

One optimisation layer can be arranged to determine the objective demands of different compressor stations which are connected in series or in parallel. Long-term optimisation can focus on the optimisation of the machines in each independent compressor station, deciding which machines to use and when. For the example of a textile factory, several sequential processes take place to convert raw material ("yarns") into end products ("textiles"). In each process stage there may be several multiple machines such as weaving machines which can do the same job but their efficiency and/or production rate may vary significantly. A textile plant conventionally needs to produce thousands of products and these products can be stored in intermediate and end storage facilities (inventories or stocks). The objective of the factory in this example is to produce textile fabrics to be delivered to the customer at promised dates. The problem here is a multi-stage, multiple machines with multi-products problem. Owing to the high complexity in the operations of textile factories there may be significant inefficiencies in management and control of the operational and maintenance resources. Such inefficiencies may include machines usage, staff shifting and maintenance activities. The results may be that products are overstocked, there are large amounts of work in progress and there are long cycle times to produce products. The method of this embodiment involves an optimisation layer which determines what are the optimal inventory levels of the products. The optimisation considers forecasted demands of the products and plant constraints such as production capacity for each product and maintenance activities. The optimisation will determine the optimal amount of each product to stock for the next month.

A second optimisation layer may be arranged to determine which machines to use and the order of the products to process in each machine. The objective is to satisfy customer orders and stock levels for the upcoming weeks. The optimisation may consider the stock levels determined from a previous optimisation layer, and perform the scheduling accordingly. Data analysis may generate data-driven models which define the performance of each machine measured in metres produced per hour. Data analysis can also be used to predict when a machine may fail which can be essential for deciding which machine to use to process a job with related deadlines and costs.

A third optimisation layer can be used to tune and operate the machines in real time to achieve the objectives given from a previous optimisation layer. For example, the third optimisation layer can be used to decide the set point of the speed of a weaving machine. A range of different of optimisations may be integrated into this arrangement, including one or more of: real time optimisation (RTO); scheduling; and/or planning.

A further example is provided: considering a semiconductor manufacturing plant producing wafers used in the electronics industry. The production of such wafers conventionally requires hundreds of processing steps to complete. In a semiconductor manufacturing factory (also referred to as "fab" or "foundry"), there are conventionally hundreds of multiple machines which are used to process wafers. Owing to a large number of processing steps and multiple products and the uncertainty in the quality of the end product, semiconductor manufacturing may frequently deal with process bottlenecks, low machine utilisation and excessive stock. These problems may be ameliorated through the use of an optimisation layer planning of the wafers to determine optimum stock levels in each storage facility, and the optimum production rate in a factory. A scheduling optimisation layer can define how to produce and meet the demands and stocks defined from the planning. Then a process optimisation layer can be used to determine how to operate the machines and the optimum set points.

The examples herein may be considered for use as a generic and/or integrated framework for optimising operations and maintenance of any type of industrial plant and factory. Such a framework may involve multiple layers of optimisation, highly integrated with each other. Further beneficial effects may be produced through the integration of data-driven models and optimisation working in an automatic fashion, with no human involvement in the calculations in real time from the time point where data is received until the point where the output is given to the IT systems. Such an arrangement may be used where simultaneous operation and maintenance considering uncertainty has led to inefficiency of production.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

The invention claimed is:

1. A computer program product including one or more non-transitory machine-readable mediums encoded with instructions that when executed by one or more processors cause a process to be carried out for the control of one or more industrial machines, the process comprising:
building and/or updating, via a first, short term data-driven, optimisation module, one or more statistical models from real-time sensory data relating to the one or more industrial machines;
modelling and/or predicting, via a second, long term data-driven, optimisation module, the performance of one or more industrial machines based on (1) historical data relating to the one or more industrial machines and (2) forecasted information relating to the one or more industrial machines, the historical data comprising one or more of weather conditions data, utility prices data, and/or operation data of the one or more industrial machines, and the forecasted information comprising one or more forecasted demands on the one or more industrial machines, one or more demands on product produced by the one or more industrial machines, and/or one or more demands on a utility used to run the one or more industrial machines; and
generating, via the first and/or second optimisation modules, one or more decisions regarding the operation of the one or more industrial machines.

2. The computer program product claim 1, wherein the one or more decisions are provided as one or more inputs to one or more control systems relating to the one or more industrial machines.

3. The computer program product of claim 1, wherein the real-time sensory data is collected from one or more sensors operable to generate data regarding the one or more industrial machines.

4. The computer program product of claim 3, wherein the real-time sensory data is in relation to one or more of: a pressure; a temperature; vibration; volumetric flow, humidity; and/or a power output.

5. The computer program product of claim 1, the process further comprising: reducing, via the first optimisation module, operational costs which include one or more of: one or more energy costs; one or more costs or penalties relating to non-satisfaction of demand or non-delivered production; and/or water costs.

6. The computer program product of claim 1, wherein the forecasted information includes the one or more demands on product produced by the one or more industrial machines and/or the one or more demands on a utility used to run the one or more industrial machines.

7. The computer program product of claim 6, wherein the forecasted information comprises one or more utility prices.

8. The computer program product of claim 1, wherein the historical data comprises one or more of: historical sensor; start and end times of one or more processing jobs; one or more maintenance requirements; and/or maintenance history.

9. The computer program product of claim 1, the process further comprising: reducing, via the second optimisation module, total costs of running the one or more industrial machines which include one or more of: one or more energy costs; one or more cleaning and maintenance costs; one or more labour costs; one or more production loss costs; one or more inventory costs; operating costs including start-up costs; one or more emissions costs; and/or one or more costs of the purchase of external products for when a local plant cannot meet its own required demand.

10. The computer program product of claim 1, the process further comprising: performing one or more of: reducing work in progress; increasing profit; increasing production; and/or reducing cycle times.

11. The computer program product of claim 1, wherein the first and/or second optimisation modules account for a measure of uncertainty or an uncertainty value in relation to one or more forecasted parameters comprising one or more of: one or more processing times of jobs; one or more future temperatures; one or more fault predictions; and/or one or more of the one or more forecasted demands.

12. The computer program product of claim 1, the process further comprising:
performing, via a third, medium term data-driven, optimisation module, one or more predictions of maintenance requirements, wherein performing the one or more predictions of maintenance requirements includes analysing the probability distribution of time taken until failure of one or more pieces of equipment; and/or
determining, via the third optimisation module, a schedule for maintenance using one or more uncertainty parameters, one or more utility prices, and/or one or more of the one or more forecasted demands.

13. The computer program product of claim 1, the process further comprising:
building and/or updating, via a third, medium term data-driven, optimisation module, one or more statistical models, the one or more statistical models comprising a predictive fault model to predict faults occurring in the one or more industrial machines; and wherein the generating includes generating, via the first, second, and/or third optimisation modules, one or more decisions regarding the operation of the one or more industrial machines.

14. The computer program product of claim 13, wherein the third optimisation module considers uncertainty in one or more of: one or more of the one or more forecasted demands; one or more raw material specifications; and/or one or more utility prices.

15. The computer program product of claim 1, the process further comprising: providing, by the second optimisation module, an optimization objective and/or an operational configuration of the one or more industrial machines to the first optimisation module.

16. The computer program product of claim 1, wherein the second optimisation module considers uncertainty in one or more of: one or more future cost functions; and/or one or more of the one or more forecasted demands; wherein the one or more future cost functions comprise one or more costs of products and/or one or more utility costs.

17. The computer program product of claim 1, the process further comprising: modelling and/or predicting one or more demands of one or more industrial plants and/or factories.

18. An optimisation control apparatus for one or more industrial plants and/or factories, the apparatus comprising the computer program product of claim 1.

19. A system for optimising for control of one or more industrial machines, the system comprising:
one or more processors;
a first, short term data-driven, optimisation module, executable or controllable by the one or more processors to build and/or update one or more short term statistical models from real-time sensory data relating to the one or more industrial machines, the one or more statistical models describing current performance of the one or more industrial machines;
a second, long term data-driven, optimisation module, executable or controllable by the one or more processors to build and/or update one or more long term statistical models, the one or more long term statistical models comprising a forecasting model to forecast (1) one or more demands one or more demands on product produced by the one or more industrial machines, and/or (2) one or more demands on a utility used to run the one or more industrial machines; and
a third, medium term data-driven, optimisation module, executable or controllable by the one or more processors to build and/or update one or more medium term statistical models, the one or more medium term statistical models comprising a predictive fault model to predict faults occurring in the one or more industrial machines;
wherein one, two or all three of the first, second, and third optimisation modules generate one or more decisions regarding the operation of the one or more industrial machines.

20. A method of optimising for control of one or more industrial plants and/or factories, the method comprising:
building and/or updating one or more statistical models from real-time sensory data relating to one or more industrial machines included in the one or more industrial plants and/or factories;
predicting and/or modelling the performance of the one or more industrial machines based on (1) historical data relating to the one or more industrial machines and (2) forecasted information relating to the one or more industrial machines, the historical data comprising one or more of weather conditions data, utility prices data, and/or operation data of the one or more industrial machines, and the forecasted information comprising one or more forecasted demands on the one or more industrial machines, one or more demands on product produced by the one or more industrial machines, and/or one or more demands on a utility used to run the one or more industrial machines; and
generating one or more decisions regarding the operation of the one or more industrial machines based on the building and/or updating one or more statistical models and/or predicting and/or modelling the performance of one or more industrial machines.

* * * * *